United States Patent [19]

Dagés

[11] 4,243,572
[45] Jan. 6, 1981

[54] ALKYL ALKYLARYL ADIPATE PLASTICIZERS FOR POLYVINYL BUTYRAL

[75] Inventor: Daniel Dagés, Les Mureaux, France

[73] Assignee: Saint-Gobain Industries, Aubervilliers, France

[21] Appl. No.: 95,786

[22] Filed: Nov. 19, 1979

[30] Foreign Application Priority Data

Nov. 21, 1978 [FR] France .................. 78 32737

[51] Int. Cl.³ .............................. C08K 5/11
[52] U.S. Cl. .................. 260/31.8 R; 428/437; 560/146; 560/193
[58] Field of Search .............. 260/31.8 R, 31.8 W; 428/437; 560/146, 193

[56] References Cited

U.S. PATENT DOCUMENTS

| 2,124,315 | 7/1938 | Ryan | 260/31.8 W |
| 2,682,520 | 6/1954 | Bump | 260/31.8 R |
| 3,522,143 | 7/1970 | Motter | 428/437 |
| 3,838,091 | 9/1974 | Kanno | 260/31.8 R |
| 3,884,865 | 5/1975 | Fariss | 260/31.8 R |
| 3,920,878 | 11/1975 | Fariss | 428/437 |
| 4,144,217 | 3/1979 | Snelgrove | 260/31.8 W |

OTHER PUBLICATIONS

Chemical Abstracts, vol. 86, No. 6, Feb. 7, 1977, p. 34, 86:3053X.

*Primary Examiner*—Paul R. Michl
*Attorney, Agent, or Firm*—Pennie & Edmonds

[57] ABSTRACT

A plasticizer for polyvinyl butyral wherein the plasticizer is an alkyl alkylaryl adipate and particularly a benzyl alkyl adipate. The plasticized polyvinyl butyral is specially useful in the manufacture of transparent sheets and particularly as an interlayer for laminated safety glass.

20 Claims, No Drawings

ALKYL ALKYLARYL ADIPATE PLASTICIZERS FOR POLYVINYL BUTYRAL

BACKGROUND OF THE INVENTION

1. Field of the Invention

The invention relates to alkyl alkylaryl adipate plasticizers for polyvinyl butyral and to the production and use of plasticized polyvinyl butyral resin, particularly as an interlayer for liminated safety glass.

2. Description of the Prior Art

Plasticized polyvinyl butyral is widely used in the manufacture of transparent sheets and particularly as an interlayer in laminated safety glass such as glass for transportation vehicles, eyeglasses, shields, screens and in various architectural applications such as show windows, etc. While the art teaches a relatively very large numbers of plasticizers as suitable for plasticizing polyvinyl butyral, only a few plasticizers are known when the plasticized polyvinyl butyral is to be subsequently used as an interlayer in safety glass. One of the reasons for this is that polyvinyl butyral is a resin whose polymerized molecules exhibit wide variations in the total number of butyral and residual hydroxyl acetate groups that are present in the molecular chain, and in addition, the molecular masses of the resins vary greatly. The suitability of a given plasticizer is significantly dependent upon the foregoing features of the resin and particularly upon the number of residual hydroxyl group.

Therefore, among the known and typical plasticizers many are incompatible or at best only partially compatible with polyvinyl butyral resin—the most typical manifestation of incompatibility is the exudation of plasticizer from the plasticized polyvinyl butyral resin.

Furthermore, and for various reasons, many plasticizers which while compatible with polyvinyl butyral in that exudation does not occur, nevertheless do not provide the properties required when the resulting plasticized product is to be used in high performance laminated safety glass. Specifically, the polyvinyl butyral laminated glasses must possess not only good optical qualities but also the properties of good impact resistance—even at extreme temperatures—and a resistance to delamination or loss of adhesion between the sheets of glass. Conventional plasticizers yield a plasticized polyvinyl butyral resin which, when used for lamination, yields a laminated glass deficient in one or more of these properties.

Known plasticizers for polyvinyl butyral are the diesters of dicarboxylic acids, such as certain adipates, and especially those in which the diacid contains 4 to 14 carbon atoms. The alcohol fraction of the ester is made up of alkyl or alkoxyalkyl radicals containing fewer than 12 carbon atoms. U.S. Pat. Nos. 2,124,315 and 3,884,865, for example, mention methyl, ethyl, propyl, butyl, pentyl, hexyl and octyl adipates. However, these adipates have only partial compatibility with polyvinyl butyral, and even this partial compatibility decreases as the hydroxyl content of the polyvinyl butyral resin increases, or as the molecular mass of the adipate plasticizer increases. Also, those plasticizers which possess a vapor pressure greater than 10 mm Hg at 175° C. tend to produce bubbles, delamination or other defects in the resulting laminated sheet.

On the other hand, the art teaches that plasticizers of the type consisting of glycol esters of carboxylic acids, or dialkyl or alkoxyalky esters of dicarboxylic acids, provide good flexibility at low temperatures, but such is not the case with plasticizers such as phthalates containing polarizable groups such as benzene rings. Among the publications dealing with such plasticizers, there may be mentioned in particular *Kunstoffe*, vol. 60, pages 301 to 308 (1970), which deals more particularly with plasticizers for polyvinyl chloride; U.S. Pat. No. 2,290,193, dealing with plasticizers for polyvinyl acetal; and *Internation Polymer Science and Technology*, vol. 2, pages 90 to 106, which relates to plasticizers for rubber.

SUMMARY OF THE INVENTION

The present invention relates to a plasticizer for polyvinyl butyral comprising an alkyl alkylaryl adipate of the formula:

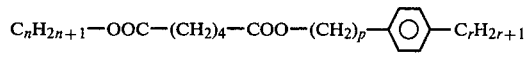

where n is an integer greater than 0 and p and r are integers whose sum is greater than 0. The invention further relates to the production and the use of the resulting plasticized polyvinyl butyral resin and particularly to the application of the plasticized resin as an interlayer for laminated safety glass.

DESCRIPTION OF THE PREFERRED EMBODIMENTS

The present invention makes it possible to obtain improved laminated safety glass by providing polyvinyl butyral interlayers capable of yielding high performance laminated safety glass devoid of the drawbacks discussed above which are attendant with polyvinyl butyral plasticized in accord with the present state of the art. In accordance with one aspect of the invention, the plasticizer for the manufacture of the plasticized polyvinyl butyral is an alkyl alkylaryl adipate of the formula:

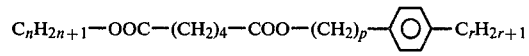

where n is an integer greater than 0 and p and r are integers whose sum is greater than 0. A further and implicit requirement is of course that p and r are not simultaneously zero.

The preferred alkylaryl group in the adipate compounds of this invention is benzyl, that is, when p is equal to 1, and r is equal to 0 in the foregoing formula. It is also preferred that the number of carbon atoms of the alkyl group be between 2 and 10, that is, when n is between 2 and 10.

Exemplarily, one may mention the following adipates as suitable for plasticizing of polyvinyl butyral in the context of the present invention: benzyl butyl adipate, benzyl octyl adipate, benzyl hexyl adipate, and benzyl decyl adipate.

Surprisingly, and contrary to what has been hitherto known in and expected from the art, the adipates of this invention which contain an alkylaryl group in their molecule, and particularly the benzyl group, demonstrate superior compatibility with polyvinyl butyral as compared to that seen with the usual dialkyl adipates. The use of the adipate plasticizers of this invention further yield good low temperature properties in the resulting laminated safety glass.

In accordance with a further aspect of this invention, the polyvinyl butyral resins which can be advantageously plasticized and then used as interlayers for laminated safety glass are preferably prepared in accord with the process disclosed in French Pat. No. 2,401,941. The molecular mass of the resulting resin is between about 30,000 and 600,000; the molecular chain contains from about 12 to 25% by weight hydroxyl groups calculated as polyvinyl alcohol and has a content of residual ester groups below 10% by weight, calculated as polyvinyl ester, for example acetate, the remainder being essentially butyraldehyde acetal.

The amount of plasticizer to be admixed with the polyvinyl butyral depends on the particular features of the polyvinyl butyral resin, as, for instance, indicated above, and, for a given application one skilled in the art can easily and readily determine the precise amount to be used. It has been found advantageous to use the plasticizer in proportions such that the plasticizer content in the resulting plasticized polyvinyl butyral is between about 15% and 65% by weight.

The plasticized polyvinyl butyral is obtained by admixing the polyvinyl butyral resin with the plasticizer. Plasticization is carried out in accordance with the classical methods well known to those skilled in the art. For example, the polyvinyl butyral resin can be placed in a mixer and the determined quantity of plasticizer can be added gradually and with agitation. Mixing can be carried out at ordinary temperature and for a period of about 30 minutes, but also at higher temperatures and for different times. The method described in French Pat. No. 2,235,631 can also be used. The mixers described in the article appearing in the journal *Les Techniques de l'Ingenieur* (reference J,1930) can be used. After mixing, a mass is obtained which can be extruded so as to make sheets having any desired thickness, for example, of 0.76 mm. These sheets may then be used as interlayers for laminated glass.

The above-cited French Pat. No. 2,401,941 also describes more precisely a process for the preparation of polyvinyl butyral by the reaction of polyvinyl alcohol with butyraldehyde, in an aqueous solution such that the aqueous solution contains between about 8 and 15% by weight of polyvinyl alcohol. Thereafter, an acid catalyst and an emulsifier are incorporated into the solution and the resulting mixture is maintained under agitation at a temperature of between about 5° and 12° C. To this mixture is added butyraldehyde in a quantity sufficient to react with 75 to 88% of the polyvinyl alcohol present therein—the introduction of the butyraldehyde is carried out gradually over a period of time such that the polyvinyl butyral begins to precipitate at a time between about 10 and 90 minutes after initial introduction. The resulting mixture is maintained, with agitation, for a period of time greater than about 30 minutes and at a temperature of from 8° to 15° C. Thereafter, the temperature of the mixture is gradually raised over a time interval of between about 1.5 and 4 hours to between about 60° and 80° C. When this temperature value is obtained, a base is incorporated into the mixture until a pH between about 9 and 11 is achieved and the temperature is further maintained at this value for a period of time greater than about one-quarter of an hour. The precipitated polyvinyl butyral is then separated from the mixture.

The laminated glasses prepared in accordance with the invention and having an interlayer of polyvinyl butyral plasticized with alkyl alkylaryl adipate, exhibit satisfactory results in tests for resistance to boiling water according to DIN Standard 52308, as well as resistance to aging at weathering stations.

The invention likewise contemplates the use of various additives in the plasticized polyvinyl butyral interlayers of the invention. Such additives include colorants, pigments, stabilizers, antioxidants, ultraviolet absorbers, adhesion modifiers, etc., and are all well known to the man skilled in the art.

The testing methods that were employed to demonstrate the unique and distinct advantages of the present invention are as follows:

COMPATIBILITY

The compatibility of the resin-plasticizer system is determined by extruding, at a temperature of 175° C., the appropriate amounts of plasticizer and polyvinyl butyral resin in the form of a sheet 0.76 mm thick.

The freshly extruded sheet is cut into samples 5×5 cm and placed in a chamber at 22° C. and 100% relative humidity for 5 days, at the end of which time the samples are placed on a piece of paper. If the sample does not stain the paper, the plasticizer has not exuded and it is denoted as compatible with the resin.

FLOW UNDER COMPRESSION

For this test, a press with heated platens is used. A sample of plasticized polyvinyl butyral sheet 0.76 mm thick is cut by means of a punch into the shape of a disk 26 mm in diamter. The disk is placed between two layers of glass 60×60 mm. The entire sample then is place between the platens of the heated press and held at 125° C. After five minutes of preheat without any application of pressure, the glass-plasticized polyvinyl butyral glass sample is subjected to a pressure of 10 bars for 5 minutes. The flow under compression is determined by the formula wherein D represents the diameter of the present polyvinyl butyral disk, in mm:

$$F = 100 \times (D - 26/26)$$

IMPACT RESISTANCE AT VARIOUS TEMPERATURES (Falling Ball Test)

This test is carried out with a steel ball weighing 5 lbs (2.270 kgs), which is dropped onto the central portion of a flat sample of laminated glass resting in a horizontal position of a wooden frame. The sample of laminated glass measures 305×305 mm, and the sheets of glass are 3 mm thick.

The samples of laminated glass used in this test and the following ones are prepared as follows: a sheet of plasticized polyvinyl butyral 0.76 mm thick is first conditioned for humidity, then placed between two sheets of glass 305×305 mm; this assemblage is then compressed in an autoclave under a pressure of 10 bars, at 138° C., for 20 minutes. They are then conditioned for 24 hours at a well controlled temperature, either −10° C. or +21° C. or +40° C.

The test is conducted at increasing ball drop heights. The approximate height is determined at which more than 90% of the samples tested at the selected temperature resist the falling ball without being penetrated.

PUMMEL TEST (Adhesion to Sheets)

A sample of laminated glass about 150×300 mm is conditioned for 8 hours at −18° C. This sample is then placed on a support inclined at 45° and struck with a flat-headed hammer weighing 0.450 kgs until the glass is pulverized. The test surface is about 100×150 mm and the hammer blows are distributed over the entire surface. The amount of glass which remains adhered to the sheet of plasticized polyvinyl butyral is compared with a scale of "pummel" standards graded from 0 to 10.

The test is carried out on both faces of the laminated glass, and this result is therefore expressed as two values of the "pummel" scale determined in the following manner:

| % of surface of the plasticized polyvinyl butyral sheet from which the glass has become detached during breakage | "Pummel" Values |
| --- | --- |
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

The following examples are not intended in any way to limit the scope of this invention nor is the invention to be deemed limited to the embodiments described. Rather, the examples are intended to illustrate the use of certain adipate plasticizers embraced by the present invention. The plasticizers are benzyl octyl adipate, benzyl butyl adipate, benzyl decyl adipate and benzyl hexyl adipate. The polyvinyl butyral resins were prepared in accord with the process of French Pat. No. 2,401,941.

EXAMPLES 1 TO 44

These examples illustrate the use of alkyl alkylaryl adipates such as benzyl octyl adipate (BOA), benzyl butyl adipate (BBA), benzyl hexyl adipate (BHA), and benzyl decyl adipate (BDA) as plasticizers for various polyvinyl butyral resins which differ in the number of hydroxyl groups present in the molecule.

The benzyl octyl adipate that is used is, for example, the product offered commercially by the BAYER Company under the tradename ADIMOLL BO. The other adipates were synthesized in accordance with classical methods of esterification, from adipic acid, benzyl alcohol and butyl alcohol to yield benzyl butyl adipate, for example, and with the appropriate components to yield benzyl hexyl adipate and benzyl decyl adipate. These products were then purified.

To demonstrate the good results achieved by the adipates in accordance with the instant invention, these results are compared with those achieved by the other adipates known in the art as being plasticizers, and in particular bis(2-ethylhexyl) adipate (DOA) and dihexyl adipate (DHA).

For each of examples 1 to 44, Table 1 identifies the example number in the first column, while the second colum identifies the content (in %) of residual polyvinyl alcohol (PVA) hydroxyl groups in the polyvinyl butyral, the third column lists the type of adipate plasticizer that was used, column four lists the amount of plasticizer that was introduced into the polyvinyl butyral resin (expressed as parts per hundredparts of resin, phr), with column five listing the results of the compatibility test for each example and colum six reporting the calculated flow values.

TABLE 1

| Example No. | % residual PVA | Identity of Plasticizer | Amount of Plasticizer (phr) | Compatibility | Flow |
| --- | --- | --- | --- | --- | --- |
| 1 | 12 | BOA | 65 | yes | — |
| 2 | 13 | BOA | 40 | yes | — |
| 3 | 13 | BOA | 50 | yes | — |
| 4 | 18.2 | BOA | 32 | yes | 68 |
| 5 | 18.2 | BOA | 37 | yes | 72 |
| 6 | 18.2 | BOA | 40 | yes | 74 |
| 7 | 18.2 | BOA | 44 | yes | 85 |
| 8 | 18.7 | BOA | 40 | yes | — |
| 9 | 18.7 | BOA | 42 | yes | 71 |
| 10 | 20.4 | BOA | 30 | yes | 60 |
| 11 | 20.4 | BOA | 32 | yes | 63 |
| 12 | 20.4 | BOA | 35 | yes | 65 |
| 13 | 20.9 | BOA | 45 | no | 76 |
| 14 | 20.9 | BOA | 34 | yes | 61 |
| 15 | 18.7 | BBA | 40 | yes | — |
| 16 | 18.7 | BBA | 60 | yes | — |
| 17 | 18.7 | BBA | 100 | yes | — |
| 18 | 20.9 | BBA | 35 | yes | 60 |
| 19 | 20.9 | BBA | 40 | yes | — |
| 20 | 20.9 | BBA | 44 | yes | 74 |
| 21 | 20.9 | BBA | 80 | yes | 127 |
| 22 | 20.9 | BBA | 100 | yes | — |
| 23 | 20.9 | BBA | 120 | no | — |
| 24 | 18.7 | BHA | 40 | yes | — |
| 25 | 18.7 | BHA | 50 | yes | 96 |
| 26 | 18.7 | BHA | 100 | yes | — |
| 27 | 20.9 | BHA | 30 | yes | — |
| 28 | 20.9 | BHA | 35 | yes | 63 |
| 29 | 20.9 | BHA | 40 | yes | — |
| 30 | 20.9 | BHA | 60 | yes | — |
| 31 | 20.9 | BHA | 85 | yes | — |
| 32 | 20.9 | BHA | 90 | no | — |
| 33 | 20.9 | BDA | 20 | yes | 46 |
| 34 | 20.9 | BDA | 25 | no | — |
| 35 | 18.2 | DHA | 32 | yes | 64 |
| 36 | 18.6 | DHA | 34 | yes | 65 |
| 37 | 20.4 | DHA | 32 | yes | 55 |
| 38 | 20.4 | DHA | 40 | no | 60 |
| 39 | 20.9 | DHA | 32 | yes | 54 |
| 40 | 20.9 | DHA | 34 | no | — |
| 41 | 20.4 | DOA | 20 | yes | 45 |
| 42 | 20.4 | DOA | 25 | no | — |
| 43 | 20.4 | DOA | 35 | no | 60 |
| 44 | 20.4 | DOA | 40 | no | 65 |

Examples 1 to 44 demonstrate that the alkyl alkylaryl adipates of the present invention have good compatibility with polyvinyl butyral resins having different contents of hydroxyl groups. Benzyl butyl adipate, benzyl hexyl adipate, benzyl octyl adipate and benzyl decyl adipate have compatibilities superior to those of the known dialkyl adipates. The measured flows are satisfactory for use in high performance laminated glass. The greater the content of hydroxyl groups in the resin, the larger the amount of plasticizer needed to obtain a desired flow value, as is shown by Examples 4, 11 and 14. Moreover, the compatibility of the plasticizer decreases as the number of carbons in the alkyl chain is increased.

EXAMPLES 45 TO 54

These examples illustrate the ability of the alkyl alkylaryl adipates of the present invention to impart good impact resistance, especially at low temperature, to laminated glass.

It is known that plasticizers containing an aryl group, for example the phthalates, do not give impact resistance properties at low temperature, as shown in following tests 48 to 51. Furthermore, Example 54 demonstrates the very poor cold impact resistance of dibenzyl adipate while the alkyl alkylaryl adipates of the instant invention permit good impact resistance at both ordinary temperatures and at low temperatures while at the same time retaining both good adhesion as measured by the "pummel test" and high flow.

In Table 2, the first column indicates the test number; the second column indicates the plasticizer added to the polyvinyl butyral resin; the third column indicates the amount of plasticizer expressed as parts of plasticizer per 100 parts of resin (phr), as in Table 1; columns 4 and 5 indicate the results of the falling ball tests expressed, for each example, in feet and in meters, with column 4 referring to tests carried out at −10° C. and column 5 at +20° C.; and column 6 indicates the value obtained in the "pummel" tests, and column 7 indicates the flow properties.

TABLE 2

| Example | Plasticizer | Plasticizer amount (phr) | Falling ball tests −10° C. | Falling ball tests +20° C. | Pummel | Flow |
|---|---|---|---|---|---|---|
| 45 | BOA | 40 | 16ft 4.9m | 22ft 6.7m | 8 + 8 | 74 |
| 46 | BOA | 37 | 9ft 2.75m | 24ft 7.3m | 8 + 8 | 72 |
| 47 | BHA | 36 | 5ft 1.5m | 25ft 7.5m |  | 65 |
| 48 | dibutyl phthalate | 40 | 2ft 0.6m | 21ft 6.4m | 6 + 6 | 65 |
| 49 | diisobutyl phthalate | 40 | 1ft 0.3m | 12ft 3.6m | 8 + 9 | 65 |
| 50 | bis)2-ethyl-hexyl) phthalate | 40 | 1ft 0.3m | 17ft 5.1m | 8 + 9 | 60 |
| 51 | butyl benzyl phthalate | 40 | 1ft 0.3m | 25ft 7.5m | 8 + 9 | 61 |
| 52 | dihexyl adipate | 33 | 8ft 2.4m | 25ft 7.5m | 8 + 9 | 65 |
| 53 | triethylene glycol bis(2-ethyl butyrate) (FLEXOL 3GH) | 41 | 9ft 2.7m | 22ft 6.6m | 5 + 5 | 70 |
| 54 | dibenzyl | 36 | 1ft 0.3m | 17ft 5.1m | 5 + 5 | 56 |

I claim:

1. A method for plasticizing polyvinyl butyral which comprises admixing polyvinyl butyral and alkyl alkylaryl adipate of the formula:

where n is an integer greater than 0 and p and r integers whose sum is greater than 0.

2. The method according to claim 1 wherein p is equal to 1 and r is equal to 0.

3. The method according to claims 1 or 2 wherein n is between 2 and 10.

4. The method according to claim 1 wherein the alkyl alkylaryl adipate is selected from the group consisting of benzyl octyl adipate, benzyl hexyl adipate, benzyl butyl adipate and benzyl decyl adipate.

5. The method according to claim 4 wherein the alkyl aryl adipate is benzyl octyl adipate.

6. The method according to claim 1 wherein the alkyl alkylaryl adipate to be admixed with the polyvinyl butyral is in an amount such that the plasticized polyvinyl butyral contains from about 15 to 65% by weight alkyl, alkylaryl adipate based on the total weight.

7. The method according to claim 1 wherein the polyvinyl butyral has a molecular mass of between about 30,000 and 600,000, and the molecular chain contains from about 12 to 25% by weight hydroxyl groups calculated as polyvinyl alcohol and below about 10% by weight residual ester groups calculated as polyvinyl ester.

8. The method according to claim 1 wherein the admixture is conducted generally and for a period of about 30 minutes.

9. A polyvinyl butyral resin plasticized with an alkyl aryl adipate plasticizer of the formula:

$$C_nH_{2n+1}-OOC-(CH_2)_4-COO-(CH_2)_p-\bigcirc-C_rH_{2r+1}$$

where n is an integer greater than 0 and p and r are integers whose sum is greater than 0.

10. The polyvinyl butyral resin according to claim 9 wherein p is equal to 1, r is equal to 0 and n is between 2 and 10.

11. The polyvinyl butyral resin according to claims 9 or 10 wherein the alkyl alkylaryl adipate plasticizer is present in an amount of from about 15 to 65% by weight of the total weight of the plasticized polyvinyl butyral resin.

12. An interlayer for laminated safety glass comprising a polyvinyl butyral plasticized with an alkyl alkylaryl adipate plasticizer of the formula:

where n is an integer greater than 0 and p and r are integers whose sum is greater than 0.

13. The interlayer according to claim 12 wherein p is equal to 1 and r is equal to 0.

14. The interlayer according to claims 12 or 13 wherein n is between 2 and 10.

15. A plasticizer for polyvinyl butyral comprising an alkyl alkylaryl adipate of the formula:

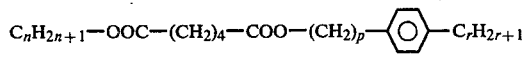

where n is an integer greater than 0 and p and r are integers whose sum is greater than 0.

16. The plasticizer according to claim 15 wherein the polyvinyl butyral has a molecular mass of between about 30,000 and 600,000, and the molecular chain contains from about 12 to 25% by weight hydroxyl groups calculated as polyvinyl alcohol and below about 10% by weight residual ester groups calculated as polyvinyl ester.

17. The plasticizer according to claim 15 wherein p is equal to 1 and r is equal to 0.

18. The plasticizer according to claims 15 or 17 wherein n is between 2 and 10.

19. The plasticizer according to claim 15 wherein the alkyl alkylaryl adipate is selected from the group consisting of benzyl octyl adipate, benzyl hexyl adipate, benzyl butyl adipate and benzyl decyl adipate.

20. The plasticizer according to claim 19 wherein the alkyl alkylarly adipate is benzyl octyl adipate.

UNITED STATES PATENT AND TRADEMARK OFFICE
CERTIFICATE OF CORRECTION

PATENT NO. : 4,243,572
DATED : January 6, 1981
INVENTOR(S) : Daniel Dages

It is certified that error appears in the above-identified patent and that said Letters Patent are hereby corrected as shown below:

Column 2, line 37, "plasticizer for the"
should read -- plasticizer used for the --;

Column 4, line 40, "F=100X(D-26/26)"
should read -- $F = 100 \times \frac{D-26}{26}$ --;

Column 6, Example No. 20 under the heading Flow, the numeral "74" should be -- 73 --;

Column 7, line 54, "p and r integers"
should read -- p and r are integers --.

Signed and Sealed this

*Twenty-first* Day of *April 1981*

[SEAL]

*Attest:*

RENE D. TEGTMEYER

*Attesting Officer*     *Acting Commissioner of Patents and Trademarks*